United States Patent [19]

Zrinscak, Sr. et al.

[11] 4,162,213
[45] Jul. 24, 1979

[54] CATALYTIC CRACKING OF METAL-CONTAMINATED OILS

[75] Inventors: Fred S. Zrinscak, Sr., Woodbury Heights; Grant G. Karsner, Westville, both of N.J.

[73] Assignee: Mobil Oil Corporation, New York, N.Y.

[21] Appl. No.: 931,574

[22] Filed: Aug. 7, 1978

Related U.S. Application Data

[63] Continuation-in-part of Ser. No. 681,379, Apr. 29, 1976, abandoned.

[51] Int. Cl.$^2$ ............................ C10G 11/04; B01J 8/24
[52] U.S. Cl. .................................. 208/89; 208/52 CT; 208/113; 208/120; 208/251 H; 252/419; 208/164
[58] Field of Search .................... 208/52 CT, 89, 120, 208/164; 252/415–420

[56] References Cited

U.S. PATENT DOCUMENTS

| | | | |
|---|---|---|---|
| 3,364,136 | 1/1968 | Chen et al. | 208/120 |
| 3,650,990 | 3/1972 | Frilette et al. | 252/455 Z |
| 3,862,898 | 1/1975 | Boyd et al. | 208/73 |
| 3,909,392 | 9/1975 | Horecky et al. | 208/120 |
| 3,944,482 | 3/1976 | Mitchell et al. | 208/120 |
| 4,016,067 | 4/1977 | Fischer et al. | 208/89 |
| 4,035,284 | 7/1977 | Gross et al. | 208/120 |
| 4,064,038 | 12/1977 | Vermilion | 208/120 |
| 4,064,039 | 12/1977 | Penick | 208/160 |
| 4,071,436 | 1/1978 | Schwartz | 208/120 |

*Primary Examiner*—Delbert E. Gantz
*Assistant Examiner*—G. E. Schmitkons
*Attorney, Agent, or Firm*—Charles A. Huggett; Vincent J. Frilette

[57] ABSTRACT

Metal-contaminated oils, including mildly hydrotreated residual oils, are catalytically cracked in the absence of added hydrogen in a fluid catalytic cracking process wherein the regenerated catalyst has less than about 0.05 wt. % residual carbon. By conducting regeneration of the catalyst to that level at 1300° to 1400° F. (preferably at about 1350° F.) with excess air, additional benefits are realized in that metal deposited on the catalyst by cracking of residual stocks is thereby passivated.

25 Claims, 2 Drawing Figures

CATALYTIC CRACKING OF METAL-CONTAMINATED OILS

CROSS-REFERENCE TO COPENDING APPLICATION

This application is a continuation in part of prior copending application Ser. No. 681,379 filed Apr. 29, 1976, and now abandoned.

BACKGROUND OF THE INVENTION

1. Field of the Invention

This invention is concerned with the catalytic cracking of metal-contaminated oils in the absence of added hydrogen. In particular, it is concerned with the fluid catalytic cracking of heavy hydrocarbon oils, such as residual oils, that contain substantial quantities of metal. Partial demetallation of such metal-contaminated oils followed by fluid catalytic cracking is another aspect of this invention.

2. Background of the Invention

Fluid catalytic cracking of hydrocarbon oils is a major refinery process. The installed plants are characteristically large, and are usually designed to process from about 5,000 to 135,000 bbls/day of fresh feed. Briefly, the catalyst section of the plant consists of a cracking section where a heavy chargestock is cracked in contact with fluidized cracking catalyst, and a regenerator section where fluidized catalyst coked in the cracking operation is regenerated by burning with air. All of the plants utilize a relatively large inventory of cracking catalyst which is continuously circulating between the cracking and regenerator sections. The size of this circulating inventory in existing plants is within the range of 50 to 600 tons. Because the catalytic activity of the circulating inventory of catalyst tends to decrease with age, fresh makeup catalyst usually amounting to about one to two percent of the circulating inventory, which corresponds to about 0.1 to 0.25 lbs. per bbl. of fresh feed, is added per day to maintain optimal catalyst activity, with daily withdrawal plus losses of about like amount of aged circulating inventory, commonly referred to as "equilibrium" catalyst.

In general, the oils fed to this process are principally the petroleum distillates commonly known as gas oils, which boil in the temperature range of about 650° F. to 1000° F., supplemented at times by coker gas oil, vacuum tower overhead, etc. These oils generally have an API gravity in the range of about 15 to 45 and are substantially free of metal contaminants.

The chargestock, which term herein is used to refer to the total fresh feed made up of one or more oils, is cracked in the reactor section in a reaction zone maintained at a temperature of about 800° F. to 1200° F., a pressure of about 1 to 5 atmospheres, and with a usual residence time for the oil of from about one to ten seconds with a modern short contact time riser design. The catalyst residence is from about one to fifteen seconds. The cracked products are separated from the coked catalyst and passed to a main distillation tower where separation of gases and recovery of gasoline, fuel oil, and recycle stock is effected.

Petroleum refiners usually pay close attention in the fluid catalytic cracking process (hereinafter referred to as the FCC process) to supplying feedstocks substantially free of metal contaminants. The reason for this is that the metals present in the chargestock are deposited along with the coke on the cracking catalyst. Unlike the coke, however, they are not removed by regeneration and thus they accumulate on the circulating inventory. The metals so deposited act as a catalyst poison and, depending on the concentration of metals on the catalyst, more or less adversely affect the efficiency of the process by decreasing the catalyst activity and increasing the production of coke, hydrogen and dry gas at the expense of gasoline and/or fuel oil. Excessive accumulation of metals can cause serious problems in the usual FCC operation. For example, the amount of gas produced may exceed the capacity of the downstream gas plant, or excessive coke loads may result in regenerator temperatures above the metallurgical limits. In such cases the refiner must resort to reducing the feed rate with attendant economic penalty. Thus, a catalyst inventory that contains excessive deposits of metal is normally regarded as highly undesirable.

The principle metal contaminants in crude petroleum oils are nickel and vanadium, although iron and small amounts of copper also may be present. Additionally, trace amounts of zinc and sodium are sometimes found. It is known that almost all of the nickel and vanadium in crude oils is associated with very large nonvolatile hydrocarbon molecules, such as metal porphyrins and asphaltenes. Crude oils, of course, vary in metal content, but usually this content is substantial. An Arab light whole crude, for example, may assay 3.2 ppm (i.e. parts by weight of metal per million parts of crude) of nickel and 13 ppm of vanadium. A typical Kuwait whole crude, generally considered of average metals content, may assay 6.3 ppm of nickel and 22.5 ppm of vanadium. Regardless of the crude source, however, it is known that distillates produced from the crude are almost free of the metal contaminants which concentrate in the residual oil fractions.

Petroleum engineers concerned with the FCC process have several ways for referring to the metal content of a chargestock. One of these is by reference to a "metals factor", designated $F_m$. The factor may be expressed in equation form as follows:

$$F_m = \text{ppm Fe} + \text{ppm V} + 10 \,(\text{ppm Ni} + \text{ppm Cu})$$

A chargestock having a metals factor greater than 2.5 is considered indicative of one which will poison cracking catalyst to a significant degree. This factor takes into account that the adverse effect of nickel is substantially more than that of vanadium and iron present in equal concentrations with the nickel.

Another way of expressing the metals content of a chargestock is as "ppm Nickel Equivalent", which is defined as $$\text{ppm Nickel Equivalent} = \text{ppm nickel} + 0.25 \text{ ppm vanadium}$$

For the purpose of this specification, we shall use the ppm Nickel Equivalent designation in discussing metals content of metal-contaminated oils, distillate stocks, and catalysts. As shown above, no mention is made of copper because this metal usually is not present to any significant extent. However, it is to be understood herein that if it is present in significant concentration, it is to be included in the computation of Nickel Equivalent and weighted as nickel.

It is current practice in FCC technology to control the metals content of the chargestock so that it does not exceed about 0.25 ppm Nickel Equivalent. Catalyst make-up is managed to control the activity of the circulating inventory. With this practice, for example, in a plant utilizing 50,000 bbls/day of fresh feed, and an equilibrium catalyst withdrawal of 9 tons per day, the withdrawn catalyst under steady state conditions will contain about 300 ppm Nickel Equivalent of metals, taking into account that the fresh catalyst contributes 70 ppm to this value. Thus, the circulating inventory is maintained at about 300 ppm Nickel Equivalents of metal, which is considered tolerable, the usual range being at about 200 to 600 ppm, with preferred operating being at about 200 to 400 ppm. It is to be understood, of course, that the metals content of the chargestock may vary from day to day without serious disruption, provided that the weighted average of the metals content does not exceed about 0.25 ppm nickel equivalent of metal.

It is important, for the purpose of the present invention, to understand that all references to the metals content of an oil, or of a chargestock, refer to the time-weighted average taken over a substantial period of time such as one month, for example. Because of the large inventory to catalyst relative to the total metals introduced into the system by the chargestock in one day, for example, the metals content of the catalyst changes little each day with fluctuations in the quality of the chargestock. However, a persistent increase in the metals content of the latter will in time result in a well-defined, calculatable increase in the metals content of the circulating inventory of catalyst, which determines the performance of the FCC unit. In fact, it is evident that the circulating inventory of catalyst, by its metals content, provides a time-average value of the metals content of the chargestock. It is in this context, then, that the phrase "metals content of the chargestock" is used herein.

For the purpose of this invention, chargestocks to the FCC process that contain up to about 0.40 ppm Nickel Equivalent of metal contaminants will be regarded as substantially free of metal contaminants. Chargestocks that contain at least about 0.50 ppm Nickel Equivalents of metal will include those chargestocks referred to as metal-contaminated.

The effects of nickel, vanadium and other heavy metals on activity and selectivity of FCC catalysts are discussed in detail by Cimbalo, Foster and Wachtel in a paper presented at the 37th midyear meeting of the API Division of Refining under the title "Deposited Metals Poison FCC Catalyst" and published at pages 112–122 of the Oil and Gas Journal for May 15, 1972, the full contents of which are incorporated herein by reference. Those authors show metal contaminants of cracking catalyst decline in poisoning activity through repeated cycles of oxidation and reduction and propose a value of "effective metals" determine by multiplication of actual metals concentration by a fraction related to the rate of fresh catalyst make-up as percent of catalyst inventory. Although the authors note that different cracking catalysts may respond differently to metal poisoning and that differences in operation of the regenerator may affect rate of metal deactivation, they establish a single standard for determination of "effective metal" values to be applied generally, presumably having regard to specific catalyst and operating conditions.

In addition to the heavy metals discussed above, residual stocks may contain alkali metals, primarily as salts such as sodium chloride derived, for the most part, from brines which are found in association with crude petroleum in the formations from which the petroleum is produced. Such salts, e.g. sodium chloride, are troublesome in refinery equipment generally, tending to deposit on fractionating trays or packing in distillation columns and elsewhere. It is conventional to "desalt" crudes which contain substantial quantities of this inorganic impurity by washing with water and settling, together with breaking of stubborn emulsions which often are present in the crude or formed during water washing. Such salt as may remain in the crude will, in due course of distillation, be found in the residual fraction.

The residual fraction of single stage atmospheric distillation or two stage atmospheric/vacuum distillation also contains the bulk of the crude components which deposit as resinous or tar-like bodies on cracking catalysts without substantial conversion. These are frequently referred to as "Conradson Carbon" from the analytical technique of determining their concentration in petroleum fractions. The Cimbalo article above cited classifies coke on spent catalyst in four groups: catalytic coke resulting from cracking of charge components; cat-to-oil, related to reactor stripper efficiency; carbon residue (Conradson) as just discussed; and contaminant coke derived from dehydrogenation reactions promoted by the heavy metal poisons nickel, vanadium, etc. The residual stocks not only provide metal poisoning of the catalyst but also show high Conradson Carbon values which are reflected by coke of that class very nearly equal to the Conradson Carbon number. It will be seen that the increment of Conradson Coke results from deposition on the catalyst of non-volatile hydrocarbons in the charge without significant change in nature of the deposited hydrocarbons.

With very limited exceptions, residual oils have not been successfully included in the chargestocks to the FCC process. The reaons for this are not fully understood, although from the foregoing discussion it is apparent that their high metals content is certainly a major contributing factor, as is the typically high Conradson Carbon. There has been interest in using them, however. The reason for this interest becomes apparent when we consider, for example, that typically only about 26 volume % of the Arab light whole crude is the 650°–1000° F. gas oil fraction, while the total 650° F. plus resid constitutes about 43 volume %. Thus, were it feasible to efficiently operate with residual oil fractions, a very substantial increase in the amount of gasoline plus fuel oil derivable from a barrel of crude could be obtained. In some refineries, the vacuum resid remaining after the distillation of the gas oil is coked and the coker gas oil is included in the FCC chargestock. However, it is generally recognized that coker gas oil, because of its high unsaturated and high aromatics content, is a poor quality feed.

It has been proposed in the prior art to hydrotreat residual oils under such conditions that the metals content is brought into the range commonly associated with gas oils. Such hydrotreated residual oils, substantially free of metal contaminants, may then be used as chargestock or a component thereof fo the FCC process. Proccesses to achieve such metals and sulfur reduction are disclosed in U.S. Pat. No. 3,891,541, issued June 24, 1975 and U.S. Pat. No. 3,876,523, issued Apr. 8, 1975, for example, the entire contents of which are incorporated herein by reference. The combination of hydrotreating to reduce metals and sulfur content followed by cracking also is disclosed in a publication by Hildebrand et al. in The Oil and Gas Journal, pp 112-124, Dec. 10, 1973, the entire contents of this article being incorporated herein by reference. However, no installation is known which has adopted the proposed scheme, probably because the cost and severity associated with the operation involves a heavy economic penalty.

It is one object of this invention to provide an improved process for the fluid catalytic cracking of metal-contaminated hydrocarbon oils. It is a further object of this invention to provide a method for the fluid catalytic cracking of residual petroleum oils which is highly selective for the production of liquids in the motor fuel and heating oil boiling ranges. These and other objects of this invention will become evident to those skilled in the art from reading this entire specification including the claims thereof.

SUMMARY OF THE INVENTION

It has now been discovered that metal-contaminated hydrocarbon chargestocks are efficiently cracked in the FCC process in the absence of added hydrogen when contacted with regenerated catalyst containing less than about 0.10 wt. % residual carbon. As more fully described hereinafter, proper regeneration of the catalyst to low values of residual carbon is a critical requirement in the practice of this invention. In fact, it is preferred that the metal-contaminated oil be contacted with regenerated catalyst containing less than about 0.05 wt. % residual carbon, the particularly preferred value being less than about 0.025 wt. %. In the practice of this invention, the chargestock preferably contains from at least about 0.50 to about 5.0 ppm Nickel Equivalents of metals. In certain circumstances, chargestocks that contain higher levels of metals, up to 10 or even 15 ppm Nickel Equivalents, may be used. The metals content of the circulating inventory of catalyst is maintained in the range of about 700 to 5,000 ppm Nickel Equivalents of metals, and preferably in the range of about 800 to 2,000 ppm. Residual or other oils that have metals content in excess of the preferred range may be economically brought into that range by known hydrodemetallation processes operated under relatively mild conditions. This invention permits the use of residual oils as part or all of the FCC chargestock without prior demetallation in some instances or with only partial demetallation in others.

It will be recognized by those skilled in the art that the specified levels of residual carbon are achievable with regenerators that operate with excess air and in which the flue gas is substantially free of unburned carbon monoxide. The use of platinum or other CO-combustion promoter in the catalyst inventory is an adjunct in the practice of the present invention, as more fully described hereinafter.

Data reported below demonstrate that the effect of residual carbon on regenerated catalyst is very different in cracking of residual stocks as compared with distillates such as gas oils. At carbon levels on regenerated catalyst having high metal content ($C_{REG}$) below 0.5% wt., conversion of a typical sour heavy gas oil will increase by about 1.5 weight % based on charge for a reduction of 0.1 in $C_{REG}$. By contrast, the increased conversion of a mildly hydrotreated resid is 6.5% for a decrease of 0.1 in $C_{REG}$. This difference in response to $C_{REG}$ of over a half of an order of magnitude presents an enormous and unexpected advantage for low $C_{REG}$ when cracking resids with metal contaminated catalyst.

In general, the catalyst to be employed will be of the varieties showing relatively low response to poisoning effect of heavy metals as discussed in the article by Cimbalo, et al. These are usually FCC catalysts of relatively low alumina content. For the most part, the so-called synthetic catalysts are more tolerant of heavy metal contaminants than are the catalysts based on clay. The catalyst make-up policy will be selected to maintain a level of heavy metal above 700 ppm up to about 5,000 ppm Nickel Equivalents having regard to metal content of the chargestock, the latter being adjustable by mild hydrotreating. Concurrently, alkali metal content (mainly sodium and so designated hereafter) is maintained at a low level approximating that of the fresh catalyst by careful desalting of the charge stock such that the hydrotreated resid charge contains not more than 1 ppm sodium as the metal. Preferably, the desalting operation is conducted on the whole crude before distillation. This combination of low sodium and controlled heavy metals is important to best results.

The purposes of the invention are realized when these controls are exercised in combination with regeneration at temperatures in the range of 1300°–1400° F., preferably 1350°±25° F., in excess air. The term "excess air" is used herein to denote oxidizing gas supplied to burning regeneration which contains more than the stoichiometric amount of oxygen to convert hydrogen content of the "coke" to water and carbon content thereof to carbon dioxide. The flue gas from operation at these temperatures with more than the stoichiometric amount of oxygen will contain a reduced amount of carbon monoxide, preferably a $CO_2/CO$ ratio of at least 5. The excess air is preferably so adjusted that the flue gas contains at least about 2 mole % of oxygen. For best results, the catalyst is provided with an oxidation promoter in the form of a few ppm or fraction of one ppm of a metal from periods 5 and 6 of Group VIII or rhenium to promote combustion of CO.

BRIEF DESCRIPTION OF DRAWINGS

A suitable form of apparatus for practice of the invention is shown in FIG. 1 as a simplified diagrammatic representation of a riser reactor FCC unit with associated regenerator.

A suitable hydrocarbon feed 10 enters the base of a riser reactor 14 in admixture with hot active catalyst 12. The cracking reactions in the riser produce a hydrocarbon product and cooled, coked catalyst which separate in the upper zone 16. Further separation of catalyst and product is accomplished by cyclone separators such as shown at 18 from which the hydrocarbon product is recovered at 16. The catalyst is deposited in the stripping section 22 into which steam 24 is introduced to displace as much hydrocarbon product as possible from the catalyst. The coked catalyst passes down a tube 26 into the dense bed 30 of a regenerator. Air 33 is pumped into the base of the regenerator at 32 fluidizing the catalyst particles and burning coke therefrom. The combustion gases force some catalyst particles upwardly into a dispersed phase 28 with the flue gas 44 exiting through cyclones 42 which separate catalyst therefrom. Provision is made to adjust temperature of regenerated catalyst before contact with charge in riser 14. In the embodiment shown, regenerated catalyst leaving the regenerator 30 via a stand pipe 12 is subjected to indirect heat exchange, for example using a water cooler 43 (see U.S. Pat. No. 4,064,039). The regenerator is provided with catalyst cooling means to avoid overheating of the dense bed 30. Such means is illustrated in FIG. 1 by an internal cooling coil 45, but a catalyst cooler external to the bed also is contemplated. The coolant may be water, in which case process steam is made, or hydrocarbon feed to be preheated.

Figure 1:
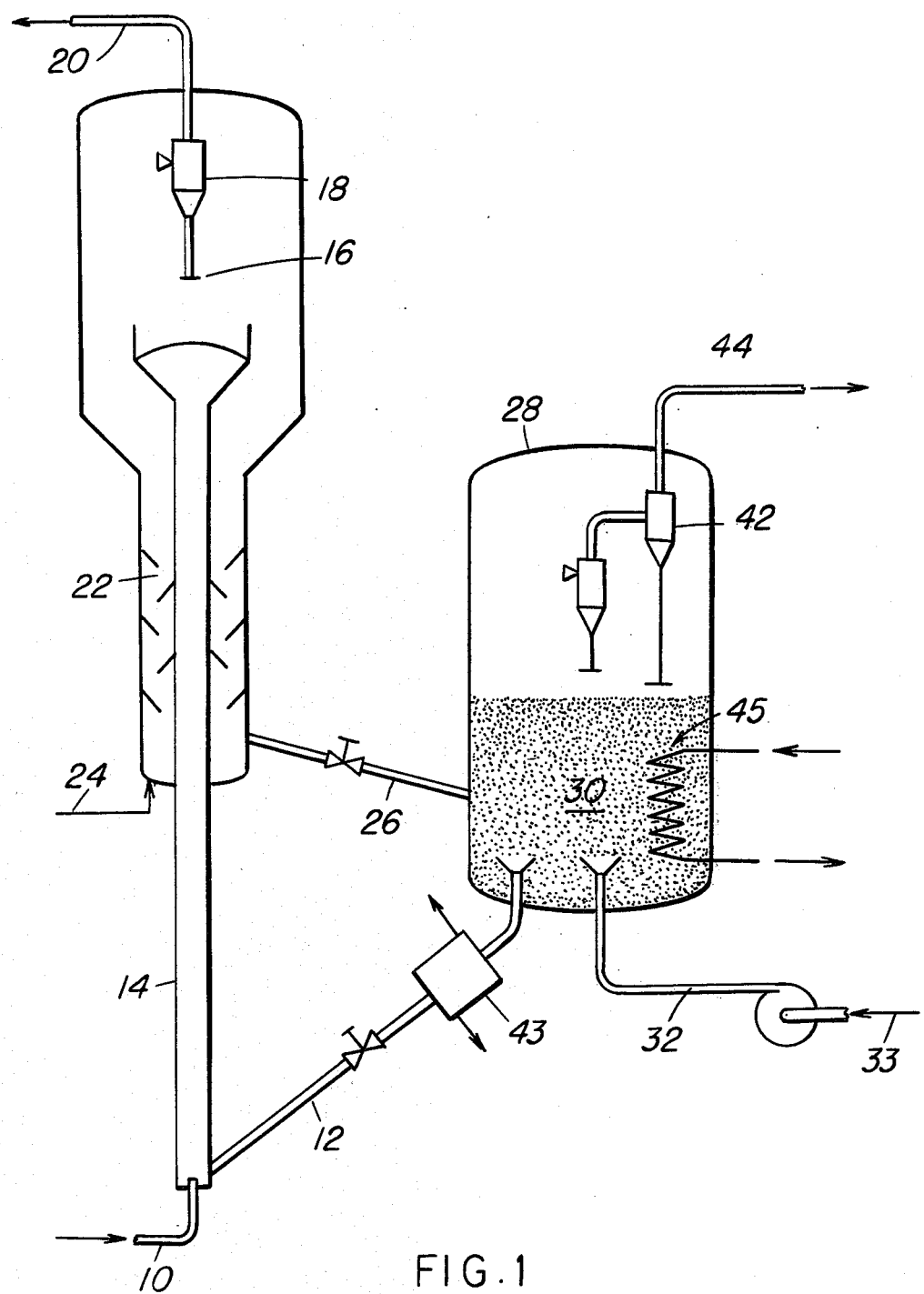
Figure 2:
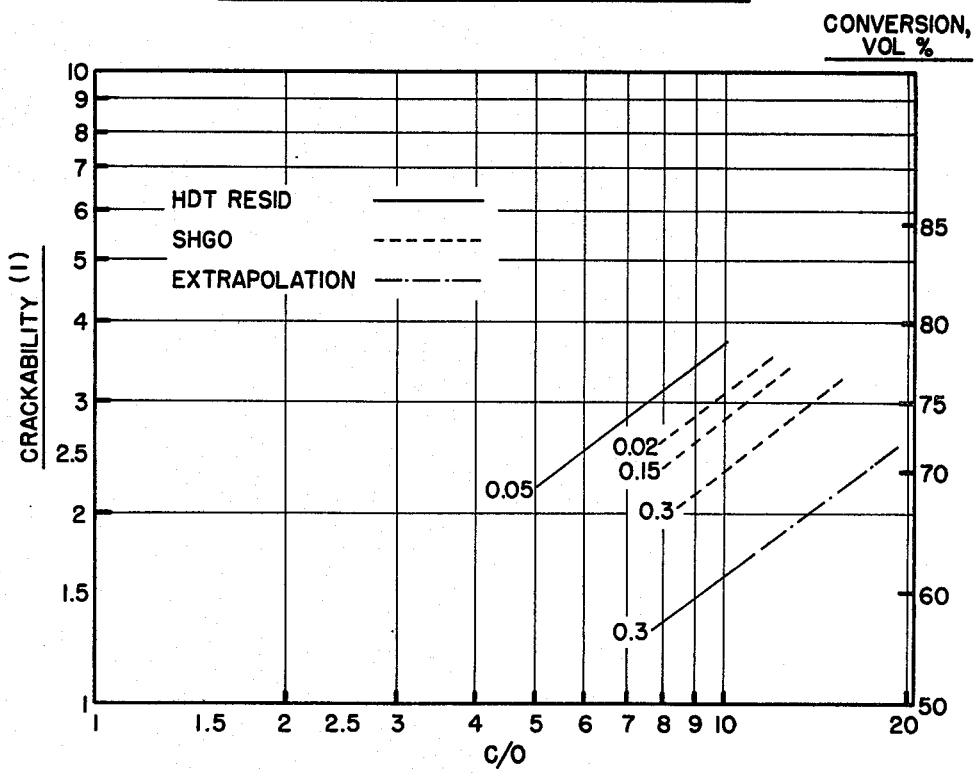

The points plotted in FIG. 2 show the differences in conversion (and in crackability) of a heavy gas oil and of a hydrotreated resid at various catalyst to oil ratios (C/O) and at different levels of coke on regenerated catalyst contaminated by heavy metals. Each line is characterized by a value of $C_{REG}$ indicated adjacent that line. The term "conversion" has the usual connotation of volume of charge less the volume of liquid in reaction products boiling above the cut point of the charge, in these cases 650° F.

DETAILED DESCRIPTION OF THE INVENTION

The term chargestock as used herein refers to the total fresh feed supplied to the process of this invention, i.e. to the oil or blends of oils that have not had prior contact with cracking catalyst. In actual practice, recycle streams may be mixed and introduced with the chargestock to be cracked in the reactor section, but it is to be understood that a limitation referring to metal content of the chargestock refers to the metal content of the fresh feed prior to blending with such recycle streams.

Any metal-contaminated hydrocarbon oil is contemplated as useful in the present invention. The preferred oils are those of petroleum origin, such as crude petroleum, topped crude petroleum, atmospheric residua and vacuum residua. However, metal-contaminated hydrocarbon oils derived from shale, coal, tar sands or other sources may be used. Mixtures of petroleum distillate oils and residue derived from petroleum and within the scope of this invention, as are blends of such residua with other hydrocarbon oils. In general, metal-contaminated chargestocks that contain residua components are preferred in the process of this invention.

The chargestocks suitable for the process of this invention are the higher boiling or the residual fractions separated at a distillation cut point of 410° F., and preferably those separated at a cut point of about 650° F. The chargestocks preferably also should not contain more than 60 percent by weight of aromatic hydrocarbons.

Although metal-contaminated hydrocarbon chargestocks that contain at least about 0.50 ppm to about 15 ppm Nickel Equivalents of metal are suitable for the process of this invention, the preferred chargestocks are those that contain from at least about 0.50 ppm to 5.0 ppm. The particularly preferred chargestocks contain from 1.0 to about 3.0 ppm Nickel Equivalents of metal. It is of course to be understood that the individual oils making up the chargestock may contain metals contamination substantially greater or less than those specified, and such oils are usable, of course, provided that the final chargestock is within the limits specified. For example, a residuum that contains 5 ppm Nickel Equivalents of metal may be blended with an equal volume of distillate oil to form the chargestock to the process, said chargestock then being characterized by a metals content of about 2.5 ppm Nickel Equivalents, which is in the particularly preferred range. Alternatively, the residual oil may be hydrotreated to demetalize it to a metals content of about 2.0 ppm Nickel Equivalents of metal, for example, and the demetalized residual oil utilized as the sole oil in the chargestock to the process of this invention. Typically, demetalization conditions comprise a hydrogen pressure of about 500 to 3,000 psig, a hydrogen circulation rate of about 1,000 to 15,000 scf/bbl of feed, a temperature of about 600° to 850° F., a space velocity of 0.1 to 5.0 LHSV, and the presence of a catalyst comprising a Group VI B metal and an iron group metal on an alumina support.

It will be recognized by those skilled in the art that FCC operation with chargestocks of the types specified for this invention normally leads to impractical levels of metal contamination of the circulating inventory of cracking catalyst. However, it has been discovered that by conducting the regeneration of the catalyst in such a manner as to leave less than about 0.10 wt. % residual carbon on the regenerated catalyst at temperatures of 1300°–1400° F. with excess air, the effect of the metal poisons on the selectivity of the catalyst is markedly suppressed. This phenomenon is illustrated by the data shown in Table I, for example, which reports the results of cracking a typical gas oil on a catalyst poisoned with about 1200 Nickel Equivalents of metal and regenerated to the usual level of 0.2 wt. % residual carbon, and the cracking of a hydrotreated residual oil on the same catalyst regenerated under conditions such that only 0.02 wt. % residual carbon is present. Both cracking operations are for 75% conversion of feed.

TABLE I

|  | Gas Oil, Normal Operation | HDT Resid, Cracking at Low $C_{REG}$ |
|---|---|---|
| % Loss in Gasoline | 10 | 0 |
| % Increase in Coke | 300 | 13 |
| % Increase in $H_2$ | 1000 | 200 |

It has furthermore been discovered that cracking metal-contaminated oils such as atmospheric residua with severely metal poisoned catalyst regenerated in the usual manner to leave about 0.2 wt. % of carbon on catalyst results in very low catalytic activity when this feedstock is compared with gas oil. This discovery is a possible explanation for the lack of commercial utilization of residual oils in FCC. This loss of activity is surprisingly very much smaller when the catalyst is regenerated to contain less than about 0.025 wt. % carbon, as illustrated in Table II.

TABLE II

|  | Cracking HDT Residua | | | Cracking Typical GO | |
|---|---|---|---|---|---|
|  | (A) | (B) | (C) | (D) | (E) |
| Reactor Temp., °F. | 980 | 980 | 980 | 970 | 970 |
| $C_{REG}$, Wt. % | 0.02 | 0.30 | 0.02 | 0.02 | 0.62 |
| Cat/oil ratio | 10 | 12.8 | 3.3 | — | — |
| Yields, % FF |  |  |  |  |  |
| Con., Vol. % | 78.3 | 61.6 | 61.6 | 83.6 | 77.0 |
| $H_2$, % Wt. | 0.34 | 0.29 | 0.19 | — | — |
| Dry Gas, % Wt. ($C_1$-$C_3$) | 6.4 | 5.7 | 5.0 | — | — |
| Total $C_4$s, Wt. % | 6.3 | 6.5 | 6.0 | — | — |
| $C_5$-385° F. at 90 Gas, Vol. % | 64.0 | 53.0 | 55.6 | 52.0 | 58.3 |
| Coke, % Wt. | 9.6 | 6.5 | 4.8 | 6.8 | 6.8 |
| Δ Conversion per 0.1% $C_{REG}$ (Calculated for same Cat/oil) | 8.0 | | | 1.1 | |

Columns (A) and (B) of Table II show the observed marked effect of the wt. % residual carbon ($C_{REG}$). Column (C) is computed for a cat-to-oil ratio selected to give the same conversion with both high and low levels of residual carbon. The reduction in dry gas and coke achieved with the low residual carbon catalyst is very substantial, i.e., the selectivity is markedly enhanced. The sensitivity of the residual oil (HDT residua) is unexpectedly large, as shown in the last line of the table. These effects, while present, have been reported to be very much smaller with a typical gas oil chargestock, as shown in columns (D) and (E).

It is a necessary condition in the process of this invention that the catalyst be regenerated under such conditions as to leave less than about 0.10 wt. % residual carbon on the catalyst, and most preferably less than about 0.025 wt %. It will be recognized by those skilled in the art that the common regeneration practices leave 0.1 to about 0.3 wt. % residual carbon on catalysts. However, regenerators have been designed which, unlike the usual regenerators, utilize excess air and convert substantially all of the carbon monoxide normally formed in regeneration to carbon dioxide. With such regenerators, it is characteristic for the carbon on regenerated catalyst to have values less than about 0.05 wt. %. All known regenerators have what may be characterized as a dense fluid bed; those operating with excess oxygen are characteristically operated at high dense fluid bed temperatures, usually above 1300° F. but within metallurgical constraints of the equipment, currently about 1400° F. These high temperatures are required in order to completely combust the carbon monoxide. The actual level of residual carbon in this operation depends on the temperature of the dense bed as well as the residence time of the catalyst in the regenerator. Thus, temperatures, of at least about 1300° F., preferably 1350°±25° F., for the dense bed in the regenerator is a requirement for the process of the present invention. Typically, such regenerators operate with about 2% excess oxygen in the flue gas, and the flue gas contains typically less than about 2000 ppm of carbon monoxide. All of the foregoing remarks apply to catalysts that do not have a CO-combustion promoter present.

It has recently been discovered that the combustion of carbon monoxide in the regenerator section may be promoted by trace amounts up to about 5 ppm of an oxidation catalyst comprising at least one metal selected from the group consisting of periods 5 and 6 of Group VIII of the periodic table and rhenium, as described in U.S. Patent Application Ser. No. 649,261 filed Jan. 15, 1976 (now U.S. Pat. No. 4,072,600), the entire contents of which are incorporated herein by reference. Such promoter is effective to achieve complete CO-combustion and low levels of residual carbon on catalyst without encountering excessively high temperatures either in the dense bed or in the cyclones of the regenerator. Furthermore, the use of such combustion promoter makes it possible to achieve complete CO-combustion in regenerators designed for partial CO-combustion, such as swirl regenerators, and promotes a more uniform regeneration therein. It is preferred to utilize cracking catalyst that contains a trace amount of CO-combustion promoter in the process of this invention.

Although any fluid cracking catalyst may be used in the process of this invention, it is preferred to use cracking catalyst of high activity and selectivity such as those containing crystalline aluminosilicate zeolites, for example, zeolite X or Zeolite Y, having pore diamters greater than about 6Å. Suitable catalysts are those described, for example, in U.S. Pat. No. 3,140,249. Where the metal-contaminated chargestock of the process of this invention contains a substantial fraction of residual oil, or is entirely composed of residual oil, the coke load on the regenerator will tend to be high by virtue of the deposition of what is commonly called "Additive coke" ("Carbon residue coke" in Cimbalo et al. terminology) on the catalyst. Thus, there will be more heat available from regeneration than is required to heat the chargestock fed to the cracking section. It is contemplated in such situations that a catalyst cooler will be incorporated in the regenerator in order to sustain a heat-balanced operation as described in U.S. Pat. No. 4,064,039. FIG. 2 shows a preferred configuration. The steam generated by the catalyst cooler is useful as an adjunct in the cracking operation or in other parts of the refinery.

Where the metal-contaminated chargestock fed to the cracking section comprises a large component of hydrotreated residual oil, it is preferred to introduce the feedstock with an amount of dispersion steam in the range of about 1 to 15 wt. % of the fresh feed. This dispersion steam is effective in reducing the contact time of the oil and catalyst in the cracking section and further serves to improve the selectivity of the cracking operation. Dispersion of these heavy charge stocks is enhanced by preheating the charge to 500°–650° F.

More specifically, maximum benefits of the invention are obtained by correlating several factors:

(1) Regenerator temperature is maintained in the range of 1300°–1400° F., preferably 1350°±25° F. with excess air whereby coke on regenerated catalyst is maintained below 0.10 wt. %, preferably below 0.025 wt. %.

(2) Metal level on catalyst is maintained in the range of 700 to 5,000 ppm Nickel Equivalents.

(3) Sodium level of the catalyst is held at substantially the value of the fresh catalyst by desalting of the charge to an extent (preferably below 1 ppm) such that catalyst withdrawal compensates for the minute amount of sodium introduced with the charge.

(4) Fresh catalyst makeup policy is set to maintain high activity measured on clean burned catalyst, metals within the range specified and low sodium content of catalyst.

(5) Fresh catalyst added to the unit is of relatively high activity say above 50 FAI, preferably above 65 and of the type which is relatively stable to metals. Such catalyst are relatively low alumina synthetic catalysts (say not more than 45% $Al_2O_3$) containing zeolites and a small amount (less than 10 ppm) of a metal from periods 5 to 6 of Group VIII or rhenium.

These criteria were derived from a series of pilot plant runs at equilibrium conditions, the results of which are plotted in FIG. 2. Catalyst charged to the pilot unit was equilibrium FCC catalyst withdrawn from a commercial unit. Properties of the catalyst as charged and after reaching equilibrium metals value at above 1400 ppm Nickel Equivalent are reported in Table III. FAI activity was measured as conversion of Light East Texas Gas Oil at catalyst to oil (C/O) ratio of 2, 6 weight hourly space velocity (WHSV) in a 5 minute test at 850° F. Hydrogen Factor is determined as 100 times the moles of hydrogen divided by the sum of moles of one and two carbon atom hydrocarbons in the product.

Inspection data on charge stocks for the data of FIG. 2 appear in Table IV for a typical sour heavy gas oil (SHGO) and hydrotreated Arab Light atmospheric residuum (HDT Arab Light Resid).

TABLE III

| | Properties of Catalyst In 0.5 BPD FCC Pilot Unit | |
|---|---|---|
| Chemical Properties | Equilibrium Catalyst as charged to Pilot Unit | Catalyst at 1400 Ni Equivalent |
| $SiO_2$, Wt % | 45.2 | — |
| $Al_2O_3$, Wt % | 45.8 | — |
| $RE_2O_3$, Wt % | 3.14 | — |
| Zirconia, Wt % | 0.03 | — |
| Na, Wt % | 0.32 | — |
| Ni, ppm | 256 | 960 |
| V, ppm | 835 | 2300 |
| Cu, ppm | 35 | — |
| Fe, ppm | 3625 | — |
| Nitrogen, wt % | 0.008 | .0022 |
| Sulfur, ppm | 390 | 480 |
| Carbon, wt % | 0.140 | — |
| FAI Activity | | |
| Burned Clean | | |
| Conversion, vol % | 67.5 | 64.9 |
| Gasoline, vol % | 57.5 | 55.5 |
| Total $C_4$'s, vol % | 12.8 | 11.8 |
| Dry Gas, wt % | 4.8 | 4.0 |
| Coke, wt % | 1.27 | 1.56 |
| $H_2$ Factor | 32.2 | 262 |

TABLE IV

| | Average Analyses of Pilot Plant Charge | |
|---|---|---|
| Properties | SHGO | HDT Arab Light Resid |
| Gravity, °API | 24.0 | 22.7 |
| Sulfur, % Wt | 1.99 | 0.43 |
| Nitrogen, % wt | 0.099 | 0.11 |
| Basic Nitrogen, ppm | 327 | 225 |
| CCR, % Wt | 0.29 | 3.6 |
| Aniline Point, °F. | 171.3 | 199.5 |
| K.V. at 210° F., cs | 5.00 | 16.15 |
| Bromine No. | 4.2 | 4.1 |
| Hydrogen, % Wt | 12.1 | 12.3 |
| Metals, ppm | | |
| Nickel | 0.2 | 0.8 |
| Vanadium | 0.2 | 1.0 |
| Copper | 0.1 | — |
| Iron | 1.6 | — |
| Distillation, °F. | D-1160 | D-1160 |
| IBP | 431 | 514 |
| 5% Vol | 571 | 703 |
| 10% Vol | 613 | 728 |
| 20% Vol | 662 | 761 |
| 30% Vol | 699 | 796 |
| 40% Vol | 732 | 840 |
| 50% Vol | 766 | 888 |
| 60% Vol | 801 | 944 |
| 70% Vol | 840 | 993 |
| 80% Vol | 878 | — |
| 90% Vol | 928 | — |
| 95% Vol | 956 | — |
| Compositions, % Wt | | |
| Paraffins | 23.5 | 21.6 |
| Naphthenes | 32.0 | 27.8 |
| Aromatics | 44.5 | 50.5 |

The process of this invention may be applied to the total liquid product from hydrotreating of resids or may use gas oil range liquids or any cut between these extremes. Two typical runs, on total liquid and 650° F.+ cuts are reported in Table V. Both runs were conducted with the catalyst of Table III at 1400 ppm Nickel Equivalents of metal and containing a few ppm of platinum CO oxidation promoter. The regenerator was operated for complete CO combustion to provide 2.0 mole % excess $O_2$ in the flue gas. Catalyst temperature to the riser reactor was 1250° F., contacting preheated charge at 650° F. with 7% of steam to the riser based on fresh feed. Although preparation of the 650° F.+ charge having the properties set out in Table IV requires use of a distillation column, certain advantages in yield are found when cracking the stock of high initial boiling point. At constant FCC operating conditions, the 650° F.+ resid cracks to higher conversion and gasoline yield. The low gasoline octane produced from the $C_4+$ resid at lower gasoline efficiency reflects 2 vol % low octane gasoline in the 650° F.− portion of the FCC feed. The catalyst cooler size relative to the FCC feed volume is higher when cracking the 650° F.+ resid. The difference in cooler size reflects the different CCR values of the feedstocks. Gasoline plus distillate yields are higher for the $C_4+$ resid. This is due to the significantly higher Light Fuel Oil yield from the $C_4+$ resid. The higher potential alkylate plus $C_5+$ gasoline yields of the 650° F.+ resid offset its lower gasoline plus distillate value. Hydrogen yields are extremely low compared with what would be normally expected when cracking residual oils having the metal content described herein. Among residual oils, the hydrogen yields are lower with a $C_4+$ resid than with a 650+ resid, indicating some type of hydrogen yield dependence on feedstock at the same catalyst metal level.

TABLE V

| FCC CRACKING OF HDT ARAB LIGHT RESID | | | | | |
|---|---|---|---|---|---|
| Reactor Conditions | 650° F.+ | | $C_4+$ | | |
| Fresh Feed, API | 22 | | 23.8 | | |
| Comb. Feed Ratio, vol | 1.04 | | 1.04 | | |
| Riser Top Temperature, °F. | 1000 | | 1000 | | |
| Cat-Oil Ratio, Wt | 6.4 | | 6.4 | | |
| Oil to Riser, °F. | 650 | | 650 | | |
| Regenerated Catalyst to Riser Temperature, °F. | 1250 | | 1250 | | |
| Regenerator Temperature, °F. | 1325 | | 1325 | | |
| Riser Top Pressure, psig | 35.1 | | 33.2 | | |
| Catalyst Activity, FAI | 65.0 | | 65.0 | | |
| Carbon on Spent Cat., wt % | 1.10 | | 1.07 | | |
| Carbon on Regen Cat., Wt % | 0.02 | | 0.04 | | |
| Regenerator Conditions | | | | | |
| Coke Burned, lb./bbl F.F. | 25.5 | | 24.2 | | |
| Comb. Air, MSCF/bbl F.F. | 4.90 | | 4.65 | | |
| Comb. Air Inlet, °F. | 327 | | 327 | | |
| Regenerator Catalyst Cooler Load, MBTU/bbl | 180.9 | | 164.3 | | |
| Conversion, % vol | 85.2 | | 84.5 | | |
| Gasoline Efficiency | 81.9 | | 80.7 | | |
| Yields, % Fresh Feed | Wt. | Vol. | API | Wt. | Vol. | API |
| Heavy Fuel Oil | 5.3 | 4.7 | 0.0 | 1.7 | 1.4 | −3.7 |
| Light Fuel Oil | 10.9 | 10.3 | 13.9 | 14.8 | 14.1 | 16.8 |
| $C_5+$ Gasoline | 57.1 | 69.8 | 56.2 | 56.4 | 68.2 | 56.3 |
| Total $C_4$'s | 11.2 | 17.5 | | 12.2 | 18.9 | |
| Dry Gas | 7.6 | 9.2 | | 7.3 | 9.7 | |
| Coke | 7.9 | | | 7.6 | | |
| Total | 100.0 | 111.3 | | 100.0 | 112.3 | |
| Light Hydrocarbons | | | | | | |
| $H_2$ | 0.14 | | | 0.10 | | |
| $H_2S$ | 0.11 | | | 0.12 | | |
| $C_1+C_2$ | 1.56 | | | 1.07 | | |
| $C_2=$ | 0.61 | | | 0.49 | | |
| $C_3$ | 0.61 | 1.11 | | 0.71 | 1.27 | |
| $C_3=$ | 4.57 | 8.07 | | 4.81 | 8.40 | |
| $nC_4$ | 0.53 | 0.84 | | 0.85 | 1.33 | |
| $iC_4$ | 2.86 | 4.71 | | 3.48 | 5.67 | |
| $C_4=$ | 7.81 | 11.96 | | 7.87 | 11.91 | |
| Product Properties | | | | | | |
| Gasoline: | | | | | | |
| Research Clear Octane R+0 | | 91.6 | | | 89.6 | |
| Light Fuel Oil: Sulfur Wt % | | 0.78 | | | 0.80 | |
| Heavy Fuel Oil: Sulfur Wt. % | | 1.53 | | | 1.51 | |

TABLE V-continued

| FCC CRACKING OF HDT ARAB LIGHT RESID | | |
|---|---|---|
| Potential Alkylate plus C5+ Gasoline, vol % | 103.4 | 102.2 |

Those skilled in the art will recognize that the steadystate, or equilibrium concentration of metals in the circulating inventory of cracking catalyst can be affected and controlled by selection of the fresh catalyst makeup rate. It is contemplated, in the present invention, in some instances to use larger than usual makeup rates for this purpose, as circumstances dictate. Thus, makeup rates more than 2 percent per day and up to about 10 percent per day are contemplated. Thus, the advantages of the process of this invention may be maximized by adjusting the degree of hydrotreating and the catalyst makeup rate over wide ranges, depending on circumstances such as the cost of catalyst and of hydrogen, for example, and the characteristics of the available oils.

What is claimed is:

1. A process for catalytically cracking a metal-contaminated residual feedstock containing about 0.50 to 15.0 Nickel Equivalents of metal, which comprises, in combination:
   contacting said feedstock under cracking conditions in a cracking zone and in the absence of added hydrogen with fluidized, regenerated cracking catalyst characterized by a metals content of 700 to 5,000 Nickel Equivalent of metal and having less than about 0.10 wt. % residual carbon, whereby forming cracked products and deactivated, coked catalyst;
   separating said deactivated, coked catalyst from said cracked products;
   passing said separated, deactivated catalyst to a regeneration zone;
   contacting said deactivated coked catalyst in said regeneration zone with an excess of oxygen containing gas at 1300 to 1400F. to form said regenerated cracking catalyst having less than about 0.10 wt. % residual carbon with production of a flue gas containing free oxygen;
   and recycling said regenerated catalyst to said cracking zone, whereby selectively forming liquid cracked products.

2. The process claimed in claim 1 wherein said metal-contaminated feedstock contains from about 0.50 to 5.0 ppm Nickel Equivalents of metal.

3. The process claimed in claim 1 wherein said regenerated cracking catalyst has less than about 0.025 wt. % residual carbon.

4. The process claimed in claim 1 wherein said flue gas from said regeneration zone contains less than about 2000 ppm carbon monoxide.

5. The process claimed in claim 1 wherein said flue gas contains about 2% oxygen.

6. The process claimed in claim 1 wherein said contacting step is done with an amount of dispersion steam in the range of about 1 to 15 wt. % of said feedstock.

7. The process claimed in claim 1 wherein said cracking catalyst comprises a zeolite having a pore diameter greater than 6A and a trace amount of metal selected from the 5th and 6th periods of Group VIII of the periodic table and rhenium.

8. The process claimed in claim 1 including the step of replacing from 2 to 10 percent per day of the circulating inventory of cracking catalyst with fresh catalyst, whereby maintaining the metals contamination of said circulating inventory in the range of about 700 ppm to 5,000 ppm Nickel Equivalents of metal.

9. The process described in claim 8 wherein the percentage of fresh catalyst makeup is effective to maintain the metals contamination of said circulating inventory in the range of about 800 ppm to 2,000 ppm Nickel Equivalents of metal.

10. A process for fluid catalytic cracking of a chargestock comprising a residual oil, said chargestock containing at least about 0.50 ppm to about 15 ppm Nickel Equivalents of metal, which comprises contacting said chargestock under cracking conditions and in the absence of added hydrogen with a regenerated fluid cracking catalyst that contains about 700 to 5,000 ppm Nickel Equivalents of metal and less than about 0.05 wt. % residual carbon and recovering cracked products, said catalyst having been regenerated at 1300° to 1400° F. in an atmosphere containing an excess of oxygen.

11. The process claimed in claim 10 wherein said chargestock consists essentially of a residual oil containing at least about 0.50 ppm to about 15 ppm Nickel Equivalents of metal and said regenerated fluid cracking catalyst contains about 800 to 2000 ppm Nickel Equivalents of metal.

12. The process claimed in claim 11 wherein said chargestock is hydrotreated to reduce the metals content to within the range of at least about 0.05 ppm to 3.0 ppm Nickel Equivalents of metal prior to said contacting step.

13. The process as claimed in claim 12 wherein said cracking catalyst contains a trace amount of at least one metal selected from the group consisting of periods 6 and 7 of Group VIII of the periodic table and rhenium.

14. The process according to claim 1 or claim 10 wherein said stock contains not more than 1 ppm of sodium.

15. A process according to claim 1 or claim 10 wherein the regeneration of said catalyst is conducted at 1325° to 1350° F. in an atmosphere containing an excess of oxygen.

16. A process for catalytically cracking a metal-contaminated feedstock, said feedstock containing from about 0.50 to 5.0 ppm Nickel Equivalents of metal, which comprises, in combination:
   contacting said feedstock under cracking conditions in a cracking zone and in the absence of added hydrogen with fluidized, regenerated cracking catalyst which contains a trace amount of metal selected from the 5th and 6th periods of Group VIII of the Periodic Table and rhenium and is characterized by a metals content of 700 to 5,000 ppm Nickel Equivalents of metal and having less than about 0.10 wt. % residual carbon, whereby forming cracked products and deactivated, coked catalyst;
   separating said deactivated, coked catalyst from said cracked products;
   passing said separated, deactivated catalyst to a regeneration zone;
   contacting said deactivated coked catalyst in said regeneration zone with sufficient oxygen containing gas to substantially completely combust carbon monoxide to carbon dioxide and to form said regenerated cracking catalyst having less than about 0.10 wt.% residual carbon with production of a flue gas which contains less than about 2,000 ppm carbon monoxide;

and recycling said regenerated catalyst to said cracking zone, whereby selectively forming liquid cracking products.

17. The process claimed in claim 16 wherein said regenerated cracking catalyst has less than about 0.025 wt. % residual carbon.

18. The process claimed in claim 16 wherein said flue gas contains about 2% oxygen.

19. The process claimed in claim 16 wherein said contacting step is done with an amount of dispersion steam in the range of about 1 to 15 wt. % of said feedstock.

20. The process claimed in claim 16 wherein said cracking catalyst comprises a zeolite having a pore diameter greater than 6A.

21. The process claimed in claim 16 including the step of replacing from 2 to 10 percent per day of the circulating inventory of cracking catalyst with fresh catalyst, whereby maintaining the metals content of said circulating inventory in the range of about 700 ppm to 5000 ppm Nickel Equivalents of metal.

22. The process described in claim 21 wherein the percentage of fresh catalyst makeup is effective to maintain the metals contamination of said circulating inventory in the range of about 800 ppm to 2000 ppm Nickel Equivalents of metal.

23. A process for fluid catalyst cracking of chargestock comprising a residual oil, said chargestock containing about 0.50 ppm to about 15 ppm Nickel Equivalents of metal, which comprises contacting said chargestock under cracking conditions and in the absence of added hydrogen with a regenerated fluid cracking catalyst that contains a trace amount of at least one metal selected from the group consisting of periods 5 and 6 of Group VIII of the Periodic Table and rhenium and about 700 to 5,000 ppm Nickel Equivalents of metal and less than about 0.05 wt. % residual carbon, and recovering cracked products.

24. The process claimed in claim 23 wherein said chargestock consists essentially of a residual oil containing at least about 0.50 ppm to about 15 ppm Nickel Equivalents of metal and said regenerated fluid cracking catalyst contains about 800 to 2000 ppm Nickel Equivalents of metal.

25. The process claimed in claim 24 wherein said chargestock is hydrotreated to reduce the metals content to within the range of at least about 0.50 ppm to 3.0 ppm Nickel Equivalents of metal prior to said contacting step.

* * * * *